F. LOEDIGE.

JOURNAL BOX LUBRICANT DEVICE.

APPLICATION FILED SEPT. 5, 1911.

Reissued Dec. 26, 1911. 13,344.

Witnesses:

Chas. H. Bull.

G. F. Chase

Inventor:

Frederick Loedige.

By Dyrenforth, Lee, Christen & Wilkes

Attys.

COLUMBIA PLANOGRAPH CO., WASHINGTON, D. C.

UNITED STATES PATENT OFFICE.

FREDERICK LOEDIGE, OF CHICAGO, ILLINOIS, ASSIGNOR OF ONE-HALF TO EVAN H. WADE, OF CHICAGO, ILLINOIS.

JOURNAL-BOX LUBRICANT DEVICE.

13,344. Specification of Reissued Letters Patent. Reissued Dec. 26, 1911.

Original No. 1,000,099, dated August 8, 1911, Serial No. 626,434. Application for reissue filed September 5, 1911. Serial No. 647,784.

*To all whom it may concern:*

Be it known that I, FREDERICK LOEDIGE, a citizen of the United States, residing at Chicago, in the county of Cook and State of Illinois, have invented a new and useful Improvement in Journal-Box Lubricant Devices, of which the following is a specification.

My invention relates to an improvement in the class of lubricant-devices for the journals of car-wheels, wherein the lubricant confined in the box is in a solid form, as a cake, spring-supported in the journal-box to bear against the journal from underneath the latter through the medium of a perforate plate interposed between the cake of lubricant and the journal; and it consists in the novel features of construction hereinafter described and claimed.

Figure 1:
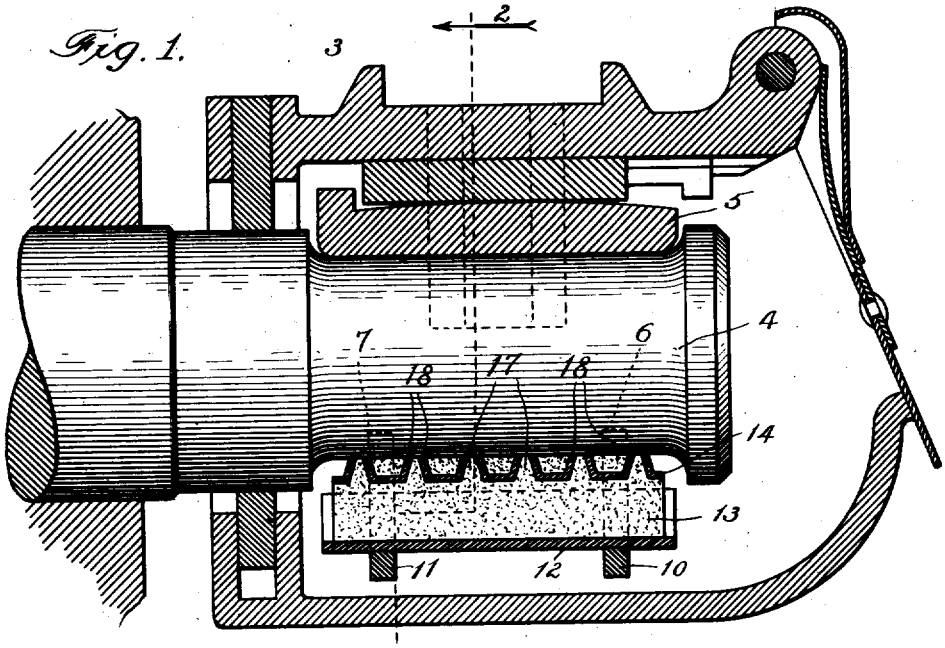
Figure 2:
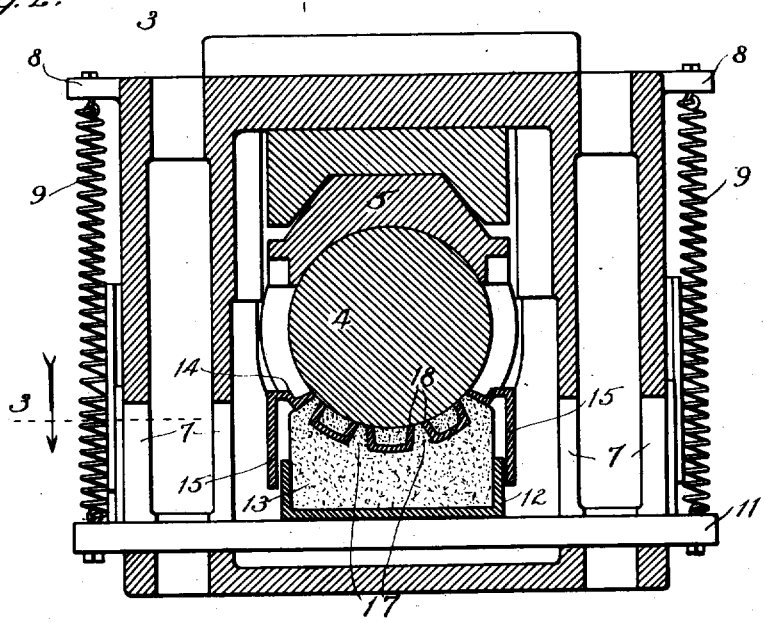
Figure 3:
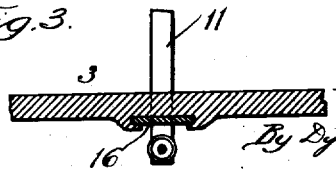

In the accompanying drawing, Figure 1 is a view in longitudinal sectional elevation of a journal-box provided with my improvement, Fig. 2 is a section on line 2, Fig. 1, and Fig. 3 is a broken section on line 3, Fig. 2.

The journal-box 3 illustrated is of the ordinary kind for housing a journal 4 and its brass 5. In the side-walls of the box are provided, near each of its ends and opposite each other, parallel vertical slots 6 and 7, forming pairs; and over each slot extends laterally from the top of the box a lug or hanger 8 from which to suspend a coiled spring 9. Bars 10 and 11 extend transversely across the interior of the box respectively through the pairs of slots 6, 7 and are suspended at their projecting ends by the springs to work underneath the journal. A holder 12, or dish, adapted to carry a cake 13 of suitable lubricant, is supported at its end-portions on the bars 10, 11; and seating on the upper longitudinally-concave surface of the cake is a laterally-flanged convexo-concave plate 14 conforming on its under side to the surface of the cake 13 upon which it bears, and on its upper side to the arc of the lower section of the journal. The depending flanges 15 of the plate lap the sides of the holder to protect the lubricant from foreign matter that may enter the box through the slots, which are provided with vertically-movable gates 16 that rest at their lower ends on the bars to yield upwardly as the springs raise the latter to cause the plate to bear against the journal notwithstanding constant diminution of the thickness of the lubricant-cake by use. The plate has formed in it, as by punching from the convex side, numerous perforations 17, from which extend burs or projections 18, which may be formed by the punching operation, to contact with the journal-surfaces. These projections are the important feature of my improvement, inasmuch as they intercept in the spaces between them the lubricant drawn through the perforations by the frictional heating and resultant softening of, and the suction action exerted upon the lubricant by the rotating journal. The lubricant thus lodges in the spaces between the projections and is thereby presented to the journal-surface in a continuous supply, since the springs maintain the cake, until used up, always against the under surface of the perforated plate and the projections on the plate against the journal-surface; and the projections oppose the tendency of the rapidly-rotating journal to wipe the lubricant from the adjacent surface of the plate off into the journal-box, which would result unless the shedding from the plate-surface in that manner of the lubricant, and the ensuing waste thereof, were thus prevented. Moreover, the presentation to the journal of the mere projections on the plate reduces the friction to the minimum and prevents impairment of the plate by overheating that would ensue if that surface of the plate were without such projections.

What I claim as new and desire to secure by Letters Patent is—

1. In combination, a journal-box and a lubricant-device comprising a holder spring-supported to extend in the box below the journal to tend to rise toward it, and adapted to confine lubricating material in cake-form, and a plate interposed between said holder and journal and having a multiplicity of perforations with projections extending individually about them and forming the contacting points of the plate with the journal and confining spaces between them for said material.

2. In combination, a journal-box and a lubricant-device comprising a dish-like receptacle in the box below the journal, adapted to contain a cake of solid lubricating material, a spring-support for said receptacle tending to raise it toward the journal, and a concavo-convex plate movably interposed between said holder and journal to seat at its convex surface against the cake of lubricating material and having a multiplicity of perforations with projections extending individually about them and forming the contacting points of the plate with the journal and confining spaces between them for said material.

3. In combination, a journal-box having slots in its sides, and a lubricant-device comprising bars extending transversely through the box below the journal therein and projecting through said slots, springs suspended on the box to extend at the outer sides thereof and connected with the bars to carry them at their projecting ends, a lubricant-holder supported within the box on said bars, and a perforated plate interposed between the holder and journal, for the purpose set forth.

4. In combination, a journal-box having slots in its sides, and a lubricant-device comprising bars projecting through said slots below the journal, springs on which said bars are suspended, a lubricant-holder supported within the box on said bars, and a perforated plate surmounting the holder and provided with projections on its upper surface bearing against the journal and forming lubricant-confining spaces, for the purpose set forth.

5. In combination, a slotted journal-box and a lubricant-device comprising a holder for the lubricant, spring-carried means supporting said holder below the journal and working in the journal-box slots, and a perforated plate surmounting the holder and provided with projections on its upper surface bearing against the journal and forming lubricant-confining spaces, for the purpose set forth.

6. In combination, a journal-box having slots in its sides, and a lubricant-device comprising bars projecting through said slots below the journal, springs depending on the outside of the box and connected with the projecting ends of the bars to carry them, a lubricant-holder supported within the box on said bars, and a perforated plate surmounting, and provided with depending flanges to lap the sides of, the holder and having projections on its upper surface at the perforations, forming lubricant-confining spaces and bearing against the journal, for the purpose set forth.

FREDERICK LOEDIGE.

In the presence of—
J. G. ANDERSON,
R. A. SCHAEFER.

Copies of this patent may be obtained for five cents each, by addressing the "Commissioner of Patents, Washington, D. C."